United States Patent [19]

Dunbar

[11] Patent Number: 4,868,793
[45] Date of Patent: Sep. 19, 1989

[54] SHARED SUB-ARRAY MARINE SEISMIC SOURCE SYSTEM

[75] Inventor: John A. Dunbar, Plano, Tex.

[73] Assignee: Atlantic Richfield Company, Los Angeles, Calif.

[21] Appl. No.: 607,055

[22] Filed: May 4, 1984

[51] Int. Cl.⁴ .............................................. G01V 1/38
[52] U.S. Cl. ....................................... 367/16; 367/23; 181/111
[58] Field of Search .................. 367/14, 15, 16, 17, 367/18, 29, 20, 21, 22, 23, 49, 144, 153, 154, 56, 57; 181/101, 108, 110, 111, 115, 107, 120

[56] References Cited

U.S. PATENT DOCUMENTS

| | | | |
|---|---|---|---|
| 2,774,955 | 12/1956 | Toomey | 367/16 |
| 3,479,638 | 11/1969 | Rusnak | 367/23 |
| 4,048,612 | 9/1977 | Lawyer | 181/108 X |
| 4,316,266 | 2/1982 | Barbier et al. | 367/23 X |
| 4,323,989 | 4/1982 | Huckabee et al. | 367/153 |
| 4,382,486 | 5/1983 | Ruehle | 181/115 X |
| 4,393,484 | 7/1983 | Buchanan et al. | 367/23 |
| 4,493,061 | 1/1985 | Ray | 181/111 X |
| 4,506,352 | 3/1985 | Brandsaeter | 367/20 X |

FOREIGN PATENT DOCUMENTS 2080533  2/1932  United Kingdom .

Primary Examiner—Brian S. Steinberger
Attorney, Agent, or Firm—Robert M. Betz; Robert D. Lott

[57] ABSTRACT

Some of the laterally spaced air gun sub-arrays which are combined to form the sequentially fired source arrays of a marine prospecting system are shared between neighboring arrays. This double usage of said sub-arrays allows a larger number of full size arrays to be fired sequentially without requiring the deployment of additional sub-arrays which may exceed the capabilities of the towing vessel. In this way multiple profiles can be collected more efficiently in performing three-dimensional seismic surveys.

8 Claims, 2 Drawing Sheets

SHARED SUB-ARRAY MARINE SEISMIC SOURCE SYSTEM

BACKGROUND OF THE INVENTION

1. Field of the Invention

This invention relates generally to the field of marine seismic exploration utilizing seismic signal sources deployed from a geophysical exploration vessel moving along a shot track. More particularly the invention concerns a system and method for firing arrays of such sources so as to simultaneously generate two or more profiles with each pass along such track.

2. Prior Art

Typically, in conventional two-dimensional seismic surveys a seismic source is discharged at shot points evenly spaced along a linear ship track. The source is typically composed of a large number of individual air guns of differing sizes deployed in linear sub-arrays each composed of five or more guns. Two or more such sub-arrays are operationally combined to form a single complete source array.

If a three-dimensional survey is to be undertaken, the sources are discharged at points along an areal grid, usually by traversing the survey along parallel lines, collecting a single profile of shot points during each pass. However, it is evident that considerable saving in ship time and thus survey costs can be achieved by collecting multiple profiles during each pass.

The standard technique now employed for collecting such multiple profiles is to deploy a separate source array for each profile to be acquired. The separate arrays are positioned relative to the seismic hydrophone streamer so that the profiles are offset perpendicularly from the ship track following parallel paths or grid lines. While theorically this technique may be used to collect more than two profiles, the current industry limit is two profiles. The reason is that survey vessels commonly can deploy only a few more sub-arrays than their standard array contains. Each time a sub-array is added more space is necessary on the towing vessel for mounting of cable reels and for handling the various electrical and air supply lines, which are usually incorporated within the towing umbilicals. Therefore to deploy separate arrays laterally displaced from each other it becomes necessary to go to smaller arrays i.e. composed of fewer sub-arrays. The result is less energy per shot and thus poorer signal to noise ratio. If three or more simultaneous parallel profiles are desired the size of an individual array may become unacceptable reduced.

It is thus a general object of this invention to provide an improved system and method for operating two or more laterally displaced marine seismic source arrays.

A more particular object of this invention is to operate such source arrays in a manner to more efficiently utilize their available energy potential.

SUMMARY OF THE INVENTION

This invention comprises generally the steps of deploying a plurality of laterally spaced apart seismic source sub-arrays from a seismic vessel towing a hydrophone streamer, combining said sub-arrays so as to form therefrom a plurality of source arrays wherein at least one sub-array of each such array is adapted to function as a part of a neighboring array, and energizing said source arrays sequentially so as to produce multiple profiles extending along parallel grid lines.

DESCRIPTION OF THE PREFERRED EMBODIMENTS

Figure 1:
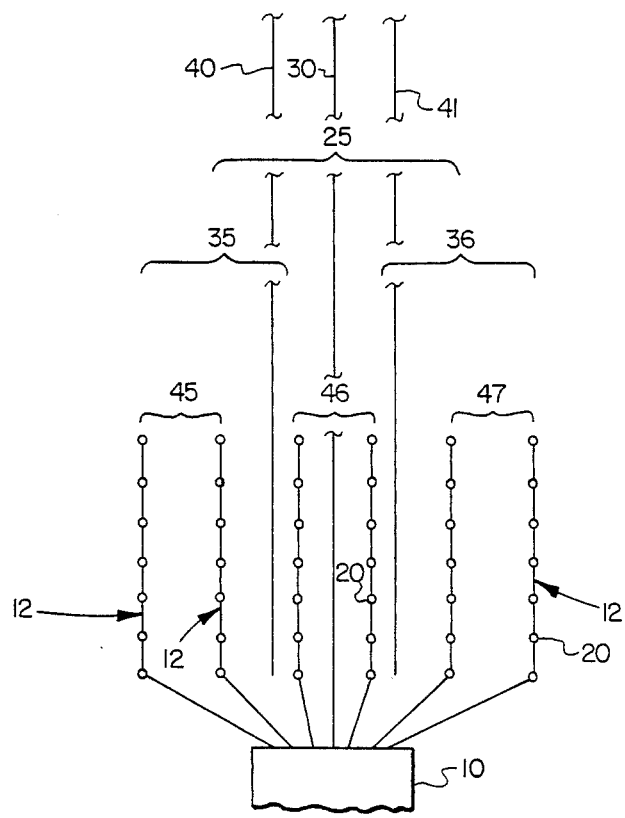
FIG. 1 is a diagrammatic representation of a plurality of seismic source sub-arrays deployed from a seismic vessel adapted to be activated in various alternate combinations in accordance with the prior art.

Referring now to FIG. 1 there is illustrated a geophysical exploration vessel 10, sometimes referred hereto herein as a seismic vessel, towing a plurality of similar seismic source sub-arrays 12 each consisting of a linear "string" on which are positioned any desired number of spaced apart energy sources 20, for example air guns. As shown there are six such sub-arrays 12, each consisting of seven individual air guns which are typically of varying size. For purposes of illustration and discussion various possible combinations of sub-arrays 12 to form complete, separately operate, source arrays in accordance with the prior art have been identified by brackets spanning with the total lateral width of each such array. For instance, source array 25 consists of four sub-arrays 12. Upon firing all said sub-arrays simultaneously a profile 13 is generated coincident with the track of vessel 10. Suppose now that it is desired to collect two separate spaced apart profiles simultaneously in one pass of ship 10 and again for illustrative purposes consider that the maximum number of sub-arrays that vessel 10 can accommodate is seven. Inspection of FIG. 1 indicates that two such profiles can be collected by forming arrays 35 and 36 each composed of three sub-arrays 12. The resultant profiles 40 and 41 will lie midway between the respective centers of arrays 35 and 36 and the track of vessel 10. However, if one desires to use this same assembly of sub-array 12 to obtain three simultaneous laterally spaced apart profiles, it would be necessary to reduce the size of the arrays still further such as in arrays 45, 46 and 47, each of which would then be composed of only two sub-arrays 12. This might reduce the energy per shot to an unacceptably low level. If each array requires a minimum of three sub-arrays the addition of a seventh sub-array would not overcome the deficiency. In fact, nine such sub-arrays would be required. Therefore, given the above limitations unless a larger capacity vessel were substituted for vessel 10 the maximum number of profiles obtainable in a single pass would be two.

Figure 2:
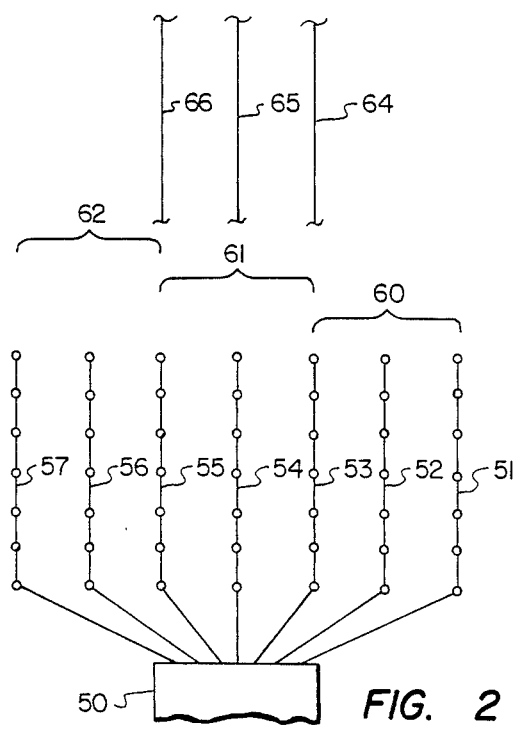
FIG. 2 is a diagrammatic representation of a plurality of seismic source sub-arrays deployed from a seismic vessel and adapted to be combined and activated in accordance with the preferred embodiment of this invention.

Turning now to FIG. 2 there shown and described a system and method for overcoming the prior art problem detailed above. Here a typical seismic vessel 50 tows a plurality of like source sub-arrays 51, 52, 53, 54, 55, 56 and 57. As indicated by brackets, complete source arrays to be fired sequentially are formed from sub-arrays 51 through 57 as follows: array 60 consisting of sub-arrays 51, 52 and 53; array 61 consisting of sub-arrays 53, 54 and 55; and array 62 consisting of sub-arrays 55, 56 and 57. It is apparent that arrays 60, 61 and 62 are not completely separate in that sub-arrays 53 and 55 are "shared", that is, each form part of two neighboring arrays. More precisely, this means that sub-arrays 53 and 55 are adapted to be fired or otherwise activated twice in each shot cycle, so that they get double use.

In a typical example the lateral spacing between any two sub-arrays FIG. 2 may be 25 meters for a total system width of 150 meters. Arrays 60, 61 and 62 may be fired sequentially at six second intervals for a total shot cycle time of 18 to 20 seconds. Three separate profiles 64, 65 and 66 will be generated with this system at a spacing of 25 meters. For full areal coverage the track spacing of ship 50 will be 75 meters.

The advantage of the system and method described with the aid of FIG. 2 is now evident. By sharing sub-arrays among arrays 60, 61 and 62 in the manner described three profiles are now obtained with the use of a total of seven sub-arrays. Functionally, this is the equivalent of three conventional arrays of three sub-arrays each.

Figure 3:
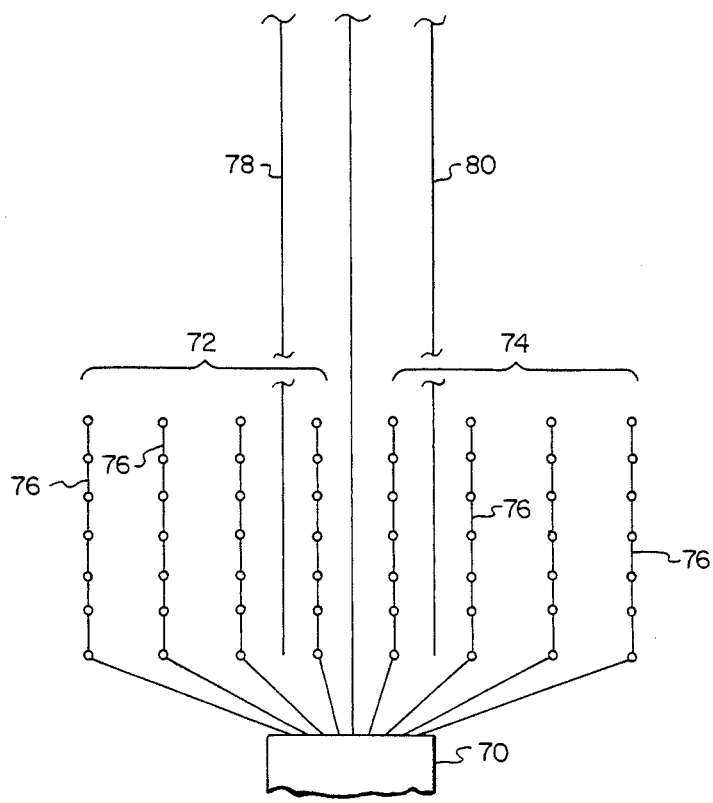
FIG. 3 is a diagrammatic representation of two seismic source arrays deployed from a seismic vessel and adapted to be activated in accordance with a further example of the prior art.
Figure 4:
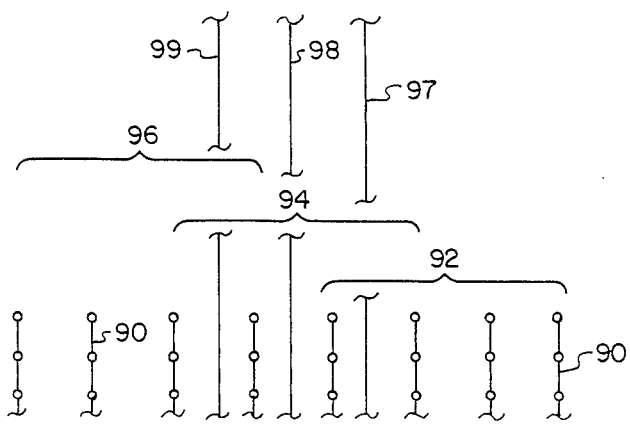
FIG. 4 is a fragmentary diagrammatic representation of a plurality of seismic source sub-arrays deployed from a seismic vessel and adapted to be activated in a manner further illustrative of the preferred embodiment of this invention.

To further illustrate the versatility of this invention consider further the prior art arrangement of FIG. 3 wherein seismic vessel 70 is adapted to tow seismic source arrays 72 and 74 each consisting of four sub-arrays 76 of like configuration. Arrays 72 and 74 are completely separate and are adapted to generate two corresponding profiles along the lines 78 and 80. If one assumes that eight such sub-arrays is the limit of the deployment capability of vessel 70 and that energy requirements are such that each array must utilize four sub-arrays there is no way to exceed two simultaneous profiles with this prior art system. By contrast, with reference to FIG. 4, eight similar spaced apart sub-arrays 90 may be combined, with sub-arrays sharing to form arrays 92, 94 and 96. It is evident from inspection that two sub-arrays 90 of each of arrays 92 and 96 are shared with array 94. The result is that three profiles 97, 98 and 99 may now be generated with no increase in the capacity of the towing vessel (not shown) or the number of sub-arrays 90.

It is apparent from the foregoing that the number of "shared" sub-arrays is a matter of choice. It is also apparent that one may also employ the method of this invention to increase the energy content of each array while leaving the number of profiles obtainable in a conventional prior art source constant. For example, one could, if desired, recombine the prior art sub-arrays of FIG. 3 to form two complete arrays (not shown) each composed of five sub-arrays, by sharing one sub-array of each such array. One could also of course share a sub-array among more than two source arrays if the resultant pulse shapes and seismic profiles provided to have practical value.

Figure 5:
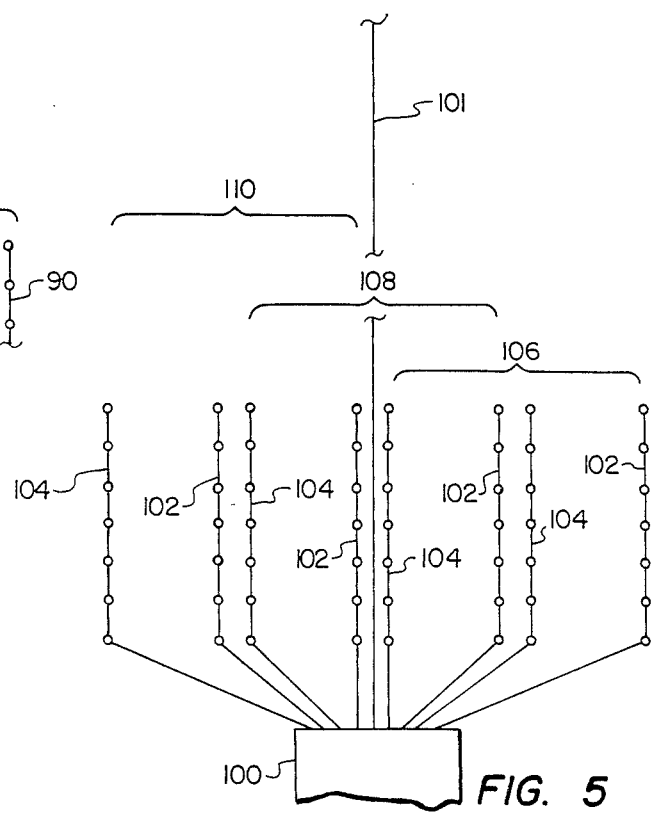
FIG. 5 is a diagrammatic representation of a plurality of seismic source sub-arrays deployed from a seismic vessel and adapted to be activated in accordance with an alternate embodiment of this invention.

As a further illustration of the utility of this invention, FIG. 5 depicts a seismic vessel 100 moving along track 101 towing laterally spaced sub-arrays 102 of a given type and energy content alternated with a like plurality of sub-arrays 104 of a different type and energy content. Sub-arrays 102 and 104 are combined as shown to form three overlapping or sharing arrays 106, 108 and 110, the significant feature being that each array 106, 108 and 110 shares at least two sub-arrays with a neighboring array. Variation in the given complement of the sub-arrays within a given source array enables one to fine tune the pulse shape of such array. Lateral spacing variations between adjacent sub-arrays, as shown in FIG. 5, permits one to control the desired radiation pattern. The embodiment of FIG. 5 therefore demonstrates the adaptability of the invention to meet various geophysical requirements.

The sharing of sub-arrays as described and illustrated above requires the design of appropriate switching mechanisms for inclusion within the associated electrical and air control systems of the towing vessel, all well within the skill of the art. The technique of sharing source sub-arrays as described in this specification is not limited to air gun arrays. It is equally applicable to arrays of water guns, steam gums, marine vibrating systems or any other type of source that is adapted to be deployed in sub-arrays whose characteristics are uniform or in predetermined relation. It should be further emphasized that while a coextensive, in-line arrangement of all sub-arrays is the simplest configuration for practice of this invention it is clearly adaptable to subarray deployment arrangements utilizing echelon, chevron or other configurations.

It is apparent that the foregoing detailed description is illustrative only and that many variations in type of source equipment and deployment of sub-arrays patterns may be made without departing from the scope of this invention as set forth herein and more particularly set out in the appended claims.

What is claimed is:

1. In the practice of marine seismic prospecting the method of collecting multiple profiles along a single seismic track comprising the steps of:
   (a) deploying a first plurality of seismic signal sub-arrays adapted to be carried along said track, said sub-arrays being laterally spaced apart with respect to the direction of said track;
   (b) combining said sub-arrays operatively so as to form a second plurality of source arrays wherein at least one of said sub-arrays is included in more than one of said source arrays;
   (c) activating said source arrays sequentially so as to generate said multiple profiles.

2. The method of claim 1 wherein said sub-arrays are identical is seismic signal generation characteristics.

3. The method of claim 1 wherein said sub-arrays are in evenly spaced coextensive parallel alignment.

4. The method of claim 1 wherein each of said sub-arrays consist of a plurality of air guns.

5. The method of claim 4 wherein adjacent sub-arrays of said air guns have different pulse signatures.

6. The method of claim 1 wherein each of said sub-arrays consists of a plurality of marine vibrating elements.

7. A marine seismic source system adapted to be carried along a seismic ship track comprising:
   (a) a plurality of separate marine source sub-arrays adapted to be deployed in laterally spaced alignment;
   (b) means for selectively activating said sub-arrays wherein at least two sets of said sub-arrays each consisting of concurrent active sub-arrays form source arrays which share at least one of said sub-arrays in their respective operations; and (c) means for sequentially activating said source arrays so as to produce multiple laterally spaced profiles parallel to said track.

8. A marine seismic source system comprising:
(a) a seismic vessel adapted to folow a prescribed seismic track;
(b) a plurality of separate identical marine air gun sub-arrays adapted to be deployed from said vessel in laterally spaced parallel alignment;
(c) means for selectively activating said sub-arrays wherein at least two sets of said sub-arrays each consisting of concurrently active sub-arrays form source arrays which share at least one of said sub-arrays in their respective operations; and
(d) means controllable form said seismic vessel for activating said source arrays sequentially so as to produce multiple laterally spaced profiles parallel to said track.

* * * * *

UNITED STATES PATENT AND TRADEMARK OFFICE
CERTIFICATE OF CORRECTION

PATENT NO. : 4,868,793
DATED : September 19, 1989
INVENTOR(S) : John A. Dunbar

It is certified that error appears in the above-identified patent and that said Letters Patent is hereby corrected as shown below:

In Claim 1:
    Column 4, line 40, delete "first";
    Column 4, line 45, delete "second".

In Claim 7:
    Column 4, line 67, after "subarrays" insert a comma.
    Column 4, line 68, after "of" delete "concurrent active" and insert --groups of said--.
    Column 4, line 68, after "sub-arrays" insert --which are concurrently active--.

In Claim 8:
    Column 6, line 5, after "subarrays" insert a comma.
    Column 6, line 6, after "of" delete "concurrently active" and insert --groups of said--.
    Column 6, line 6, after "subarrays" insert --which are concurrently active,--.
    Column 6, line 9, delete "form" and insert --from--.

Signed and Sealed this

Eighteenth Day of September, 1990

*Attest:*

HARRY F. MANBECK, JR.

*Attesting Officer*       *Commissioner of Patents and Trademarks*